United States Patent [19]
Martin

[11] 3,953,341

[45] Apr. 27, 1976

[54] STABILIZATION OF POLYMER SOLUTIONS

[75] Inventor: Fred David Martin, McMurray, Pa.

[73] Assignee: Calgon Corporation, Pittsburgh, Pa.

[22] Filed: May 8, 1974

[21] Appl. No.: 468,034

[52] U.S. Cl. .......................... 252/8.55 D; 166/274; 166/275
[51] Int. Cl.² ..................... E21B 43/20; E21B 43/22
[58] Field of Search................ 252/8.55 D; 166/273, 166/274, 275

[56] References Cited
UNITED STATES PATENTS

| | | | |
|---|---|---|---|
| 3,039,529 | 6/1962 | McKennon | 166/275 |
| 3,085,063 | 4/1963 | Turbak | 252/8.55 |
| 3,343,601 | 9/1967 | Pye | 166/275 X |
| 3,679,000 | 7/1972 | Kaufman | 252/8.55 X |
| 3,747,676 | 7/1973 | Norton et al. | 166/275 |
| 3,800,877 | 4/1974 | Knight | 166/274 X |

*Primary Examiner*—Herbert B. Guynn
*Attorney, Agent, or Firm*—Rudolph J. Anderson, Jr.; Harry E. Westlake; Martin L. Katz

[57] ABSTRACT

Use of methylolated water-soluble polymers to maintain or increase solution viscosity of polymer compositions useful in oil recovery processes.

3 Claims, No Drawings

STABILIZATION OF POLYMER SOLUTIONS

This invention relates to the recovery of petroleum from subterranean oil-bearing formations.

More particularly, this invention relates to a waterflooding process employing as the flooding medium in aqueous solution of a methylolated, water-soluble polymer selected from the group consisting of partially hydrolyzed polyacrylamide and a copolymer of acrylamide and 2-acrylamido methylpropane sulfonic acid in order to maintain and increase the solution viscosity of the polymer.

In the secondary and tertiary recovery of petroleum by water flooding, it has been proposed to employ aqueous media rendered more viscous than ordinary water or brine by the incorporation therein of water-soluble agents such as high molecular weight, water-soluble polymers. However, many polymers when in aqueous solutions undergo molecular weight breakdown or degradation. Diluted polymer solutions are more susceptible to degradation than solutions of higher concentration of the polymer. The degradation is particularly rapid when the solution is kept at an elevated temperature or a medium containing substantial amounts of oxygen. This degradation results in substantial reductions in the solution viscosity.

Various chemicals have heretofore been added to polymers in order to prevent their degradation. For example, U.S. Pat. No. 3,085,063 discloses the use of formaldehyde to minimize viscosity loss in polymeric waterflooding solutions, U.S. Pat. No. 3,343,601 discloses the use of sodium hydrosulfite and sodium sulfite to prevent polymer degradation, U.S. Pat. No. 3,747,676 discloses the use of formaldehyde to maintain the solution viscosity of unhydrolyzed polyacrylamide and U.S. Pat. No. 3,753,939 discloses the use of thiosulfates to improve the stability of polymers against thermal and oxidative degradation.

None of these prior art references, however, teaches the reaction of formaldehyde with high molecular weight, water-soluble polymers selected from the group consisting of partially hydrolyzed polyacrylamides such as those described in U.S. Pat. No. 2,827,964 and U.S. Pat. No. 3,239,509 and copolymers of acrylamide and 2-acrylamido methylpropane sulfonic acid disclosed in U.S. Pat. No. 3,679,000 to form a methylolated polymer for use as an oil recovery agent.

Accordingly, it is an object of this invention to provide an oil recovery process in which the effectiveness of the polymeric additive is maintained or enhanced under operating conditions.

It is a further object of this invention to provide an oil recovery process which increases the recovery of petroleum from a subterranean reservoir.

These and other objects of this invention are accomplished by the process of this invention in which aqueous solutions of a high molecular weight, methylolated water-soluble polymer selected from the group consisting of partially hydrolyzed polyacrylamide and copolymers of acrylamide and 2-acrylamido methylpropane sulfonic acid are introduced through an injection well, or wells, into an oil-bearing formation. The displaced oil is then recovered at one or more producing wells spaced from the injection wells. Aqueous liquids that may be employed to prepare the injection fluids include fresh water, oil field brines, ocean water and, in general, any aqueous fluid which may be available at the oil field site for practice of the invention. The molecular weight of the polymers useful in the process of this invention should be at least 200,000 and, preferably, at least 500,000 and the copolymers can contain from about 2.5 to about 75 weight percent 2-acrylamido methylpropane sulfonic acid.

In carrying out the process of this invention, the methylolated polymers may be prepared in any convenient manner, as for example, by bubbling gaseous formaldehyde directly into a solution of the polymer, adding an aqueous solution of formaldehyde to the polymer with heat and mild agitation, or adding a mixture of formaldehyde and polymer to the injection wells and using the elevated reservoir temperature to heat the mixture. The amounts used may vary from about 0.1 to about 10 and, preferably, from about 0.5 to about 15 moles of formaldehyde per mole of acrylamide and the polymer flooding medium can contain from about 0.0025 to about 0.5 percent by weight polymer, preferably from 0.005 to about 0.15 weight percent. Oxygen can be removed from the solution, if desired, by mechanical means such as vacuum deaeration or counter-current gas stripping or by chemical means such as the addition of an oxygen scavenger such as sodium sulfite or hydrazine.

The following example illustrates the viscosity improving properties of the process of this invention.

EXAMPLE 1

Polymer solutions were prepared by dissolving 600 mg. of polymer in a liter of fresh water. After mixing, the viscosity of the polymer solutions was measured with a Brookfield Model LVT with U.L. Adapter at 3, 6, 12, 30 and 60 rpm. Part of each polymer solution was stored at room temperature and oxygen was bubbled through the solution twice a day for 45 days. Another portion of the polymer solutions was capped in a bottle and placed in an oven at 205°F., the sample cooled to room temperature and the viscosity measured.

The following tables set forth the viscosity data for a high molecular weight, methylolated copolymer of 85 weight percent acrylamide and 15 weight percent 2-acrylamido methylpropane sulfonic acid (Table I) and a partially hydrolyzed (17%), high molecular weight polyacrylamide (Table II).

Table I

| RPM | Polymer Solution - No Additive Not Heated | Polymer Solution - No Additive Heated 3 Days | Polymer + 375 ppm Formaldehyde Heated 3 Days |
|---|---|---|---|
| 3  | 7.4  | 7.0  | 15.2 |
| 6  | 6.5  | 6.7  | 13.4 |
| 12 | 6.15 | 6.15 | 11.8 |
| 30 | 5.24 | 5.20 | 9.26 |
| 60 | 4.61 | 4.58 | 7.60 |

Table II

| RPM | Polymer Solution - No Additive Not Heated | Polymer Solution - No Additive Heated 6 Days | Polymer + 375 ppm Formaldehyde Heated 14 Days | Polymer + 375 ppm Formaldehyde Heated 30 Days |
|---|---|---|---|---|
| 3  | 8.8  | 8.4  | 6.6  | 7.0  |
| 6  | 8.1  | 7.7  | 6.3  | 6.7  |
| 12 | 7.5  | 7.2  | 5.9  | 6.15 |
| 30 | 6.34 | 6.48 | 5.38 | 5.60 |
| 60 | 5.61 | 5.86 | 4.87 | 5.08 |

We claim:

1. A process for the secondary or tertiary recovery of petroleum from subterranean formations penetrated by an injection well and a producing well which comprises introducing into said reservoir through said injection well a substantially oxygen free viscosity improving displacing medium to displace said petroleum from said subterranean formation, said displacing medium comprising water and a methylolated high molecular weight water-soluble copolymer of acrylamide and 2-acrylamido methylpropane sulfonic acid having a molecular weight of at least 200,000 wherein from about 0.1 to about 10 moles of formaldehyde is reacted for each mole of acrylamide in said polymer in order to increase the solution viscosity of the displacing medium.

2. A process as in claim 1 whereby the reservoir temperature is utilized to cause the methylolation reaction to occur.

3. A process as in claim 1 wherein the polymer and formaldehyde are preheated prior to injection.

* * * * *